(12) United States Patent
Kümmel (10) Patent No.: US 7,263,210 B2
(45) Date of Patent: Aug. 28, 2007

(54) METHOD AND SYSTEM FOR VOLUME-SPECIFIC TREATMENT OF GROUND AND PLANTS

(76) Inventor: Knut Kümmel, Hohenzollernstrasse 11, D-12307, Berlin (DE)

( * ) Notice: Subject to any disclaimer, the term of this patent is extended or adjusted under 35 U.S.C. 154(b) by 697 days.

(21) Appl. No.: 10/477,790

(22) PCT Filed: May 14, 2002

(86) PCT No.: PCT/DE02/01777

§ 371 (c)(1),
(2), (4) Date: Nov. 13, 2003

(87) PCT Pub. No.: WO02/091823

PCT Pub. Date: Nov. 21, 2002

(65) Prior Publication Data

US 2004/0136139 A1    Jul. 15, 2004

(30) Foreign Application Priority Data

May 14, 2001 (DE) ............................... 101 23 301
May 13, 2002 (DE) ............................... 102 21 948

(51) Int. Cl.
*G06K 9/00* (2006.01)

(52) U.S. Cl. ............... 382/110; 348/120; 104/165; 47/1.5; 47/48.5; 701/50; 239/210

(58) Field of Classification Search ............... 382/100, 382/110; 348/120; 104/165–169; 47/1.5, 47/1.7, 48.5; 701/50; 137/79; 702/2; 700/67; 239/210
See application file for complete search history.

(56) References Cited

U.S. PATENT DOCUMENTS

| 4,015,366 | A | * | 4/1977 | Hall, III ..................... 47/1.43 |
| 4,706,773 | A | * | 11/1987 | Reinaud ..................... 180/169 |
| 4,991,341 | A | * | 2/1991 | Douglas ..................... 47/1.7 |
| 5,258,822 | A | | 11/1993 | Nakamura |
| 5,278,423 | A | * | 1/1994 | Wangler et al. .......... 250/559.4 |
| 5,896,190 | A | * | 4/1999 | Wangler et al. ............ 356/4.01 |
| 6,389,785 | B1 | * | 5/2002 | Diekhans et al. ......... 56/10.2 F |
| 6,862,083 | B1 | * | 3/2005 | McConnell et al. ....... 356/4.01 |

FOREIGN PATENT DOCUMENTS

DE        199 50 396        5/2001

* cited by examiner

*Primary Examiner*—Vikkram Bali
*Assistant Examiner*—Anand Bhatnagar
(74) *Attorney, Agent, or Firm*—Andrew Wilford (57) ABSTRACT

The invention relates to a method and system for volume-specific treatment of ground and plants as required. The aim of the invention is to improve a method and system as above, such that the distribution of plants is scanned with complete spatial coverage and the treatment of the ground or plant condition is efficiently controlled, by simultaneously taking account of morphological, plant physiological, equipment performance and specific local properties.

40 Claims, 7 Drawing Sheets

METHOD AND SYSTEM FOR VOLUME-SPECIFIC TREATMENT OF GROUND AND PLANTS

CROSS REFERENCE TO RELATED APPLICATIONS

This application is the US national phase of PCT application PCT/DE02/01777, filed 14 May 2002, published 21 Nov. 2002 as WO 2002/091823, and claiming the priority of German patent application 10123301 itself filed 14 May 2001 and German patent application 10221948.6 itself filed 13 May 2002.

FIELD OF THE INVENTION

The invention relates to a method for the treatment of the ground or soil] and plants as requirements dictate and in a volume-specific manner, especially by the application/metering or dosing] of spray agents like plant protective agents and/or fertilizers as well as water, the working of the soil, under-growth cultivation and/or the processing and handling of plants, of trees, like roadway trees or forest trees or the like, limited area cultivations, especially vineyards and fruit orchards, hops, citrus, olives or the like, shrubs or bushes like bananas or the like, uniformly planted or nonuniformly planted regions, in which the plants are scanned with monochromatic pulsed laser beams generated by an individual sensor displaced in a circulatory path and projected onto the plants, using a traveling carrier on which the sensor is fixed, the reflected radiation spectrum is picked up from this sensor and in which the acquired spectrum is converted into optical signals and these signals are fed to a computer which scans the signals, evaluates them and controls the application/metering of the spray agent doses in dependence upon the vegetation state, the working of the soil and the plants as well as the crop by outputting switching commands for actuation of the spray device and blower associated with the traveling carrier and blowers and/or agricultural implements.

The invention relates further to a system for carrying out the invention with a traveling carrier, especially a vehicle and/or an agricultural machine coupled thereto. A sensor affixed to the carrier with a radiation source for outputting a pulsed laser beam, a mirror rotatable about a vertical axis for directing the beam against leaf walls, a radiation receiver for collecting reflected radiation from the leaf walls, a computer for processing the reflected radiation and for controlling a spray device having nozzles fixed to the carrier, a supply vessel for sprayed agents, whereby the nozzles are arranged at a substantial distance from the sensor, a liquid pump for displacing the spray agent to the nozzle, valves for opening and closing the nozzles and a blower for producing a two-phase flow.

The invention relates also to a system for carrying out the method with a traveling carrier, especially a vehicle, and/or an agricultural implement coupled thereto, a sensor affixed on the carrier with a radiation source for outputting a pulsed laser beam, a mirror rotatable about a vertical axis for directing the beam onto leaf walls, a radiation receiver for collecting reflected radiation from the leaf wall, a computer for processing the reflected radiation and controlled by the computer an agricultural implement affixed to the carrier whereby at least one working element of the implement is substantially spaced at a given distance from the sensor.

In the treatment of plants with liquid plant protective agents and/or fertilizers, a certain predetermined dose of the effective material must be reliably applied to all of the targeted surfaces of the plants or the problem creators thereof. For the application of such effective materials in limited area cultures like grapes, fruit, hops, citrus, olives, among others, blower spray units are used which apply liquid droplets of the atomized plant-protective agent in a two-phase free flow to the targeted surfaces of the plants, to the sides and above the spray device as it is transported past them. The spray device thus travels along a path between plant rows. Depending upon the shape of the vegetation and cultivations, the plants can be so cultivated that they form above the travel path closed vegetation cover, especially a pergola cover in the case of wine grapes or a hollow crown configuration in the case of orchards.

For the application of local plant-protective agents in limited field cultures like grapes, orchards and hops, spray devices with ultrasonically-controlled nozzles (see DE 39 00 221 A1, DE 39 00 223 A1) or optically-controlled or laser-controlled nozzles (see DE 195 18 058 A1, EP-0 554 732 A1, EP 0 743 001 A1) are used. These known devices have multiplicities of individual nozzles which are controlled by individual sensors. The individual sensors detect the presence of target surfaces in the sensing regions of the sensors.

From the course of the sensor signals, a yes-no decision is derived for each height region so that the treatment of the plants can be immediately interrupted then and there where there is no plant-like target surface which can be reached by the spray jet of the device.

In accordance with DE 195 18 058 A1, the plants are detected with individual sensors disposed one above another, preferably optical sensors, in a zonewise manner corresponding to the nozzles assigned to the different height regions of the plants. The plants are thus recognized only in small strips in a sampling process over their heights. Between the sensors, horizontally growing branches or tendrils remain unrecognized. Any information as to distance for the respective spacing between nozzle and target which corresponds to the requisite travel path for the droplets of the sprayed agent is not available. This means that for the application of the spray agent, an anticipatory opening and closing of the spray nozzle cannot be achieved and thus the processing agent in zones which are spaced from the spray device, for example open apexes of a tree or vine, are not reliably coated in a targeted manner. These zones are, however, from a phytopathological point of view especially sensitive and must, for protection of the cultivation against infection, be reliably treated.

From U.S. Pat. No. 5,278,423 A1, there is, further, a solution known in which the individual circulating laser sensors are used for detection of foliage and can be used for the control of an agricultural spray device using an output signal which can be employed to control the spray process. In this spray process a pulsed laser beam is produced utilizing a pulsed trigger signal, the laser beam being emitted from a sensor. A receiver collects reflected laser radiation from a point on the targeted tree, whereby the receiver can be provided with an outlet for a selected pulsed beam representing a transit time which corresponds to the transit time from the target point to the receiver. The pulsed laser beam scans the foliage of the targeted tree vertically whereby the scanning is determined by an angle which corresponds to the angle of the laser beam relative to a reference angle.

A setting of the sensor during a scanning cycle is determined in which the scanning cycle is a complete circuit of the laser beam around the axis of a spray path in a vertical scanning plane with a setting along the axis defined by the spray movement. Then a number of given spray regions are determined. The spray regions have a predetermined direction and the spray heads arranged on the sprayer open to discharge the sprayed agent. The operating regions, the angle and the spacing information are processed by a microprocessor to the appropriate movement range of the sprayer to take into consideration the tree height and the corresponding setting of the spray head for this height in a scanning measurement.

The sensor used in this known process includes a laser means for determining a range from the sensor to a collection of trees with foliage lying in a row and along which the sensor is moved and for outputting the corresponding output data as to this range, which has a sensor angle for each data output of the range, means for determining a travel stretch for the sensor along the foliage whereby the travel stretch represents the distance between the sensor spray heads, means for processing corresponding output data as to the range and the travel path for determining the presence and the signature of the detected foliage, whereby the processing means outputs control signals for conventional agricultural sprayers.

With this known solution, entire foliages or crowns or shadow areas can be recognized as units, with the aid of which the nozzles for applying the spray agent can be switched. Neither gaps within these units which take into consideration the development of the vegetation of the plants and their structural information nor information as to the depth of the leaf walls are considered. This means that the application of the spray agent is not spatially specific to the requirements of the plants and remains inexact, as a result of which the spray agent consumption may be correspondingly excessive or ineffective. This known solution is therefore only suitable for very high cultivations with a very large row spacing and upright plants, individually separated in each row.

Furthermore all of these known solutions for the measurement of travel require wheel sensors for a vehicle wheel. The rolling wheel on unconsolidated, differently structured surfaces, continuously undergoes slip which, depending upon the arrangement of the sensors and the nozzles, can give rise to errors with respect to the targeting precision in the application of the sprayed agent. Rolling movements of the sprayer during its travel over the unconsolidated traveled way gives rise to lateral dislocation of the individual sensors when these are located above or below the rolling center of gravity. This contributes to errors in the distance measurement as a function of the sensor position relative to the rolling center of gravity. The reference measurement points of the individual sensors shift vertically on the foliage wall which can encompass other surfaces than the zones of interest.

In the treatment of the spray edge zone of a plant crown, the rolling movement either gives rise to overspray of the leaf walls or a failure to treat the phytophylogically sensitive peak regions sufficiently at all with the spray agent.

DE 197 26 917 A1 describes a method for the contactless scanning of contours in which the contours above the ground are detected by means of a laser beam transmitter/receiver device which, while the agricultural machine is traveling, continuously detects distances to the contour across the scanning width and stores the values thereof. With a timing unit, a position determination is made.

In DE 44 34 042 C2, an arrangement for the contactless detection of travel related data from spatially separated objects is obtained which move along a travel path, street or track branch as monitoring surfaces, in which a laser, a light receiver and an evaluation device are provided which carry out a distance measurement by means of optical transit time measurement, and can be provided with a scanning device which so deflects the laser beam that this describes the envelope of a cone in its circulatory movement, the axis of symmetry and this cone being orthogonal to or inclined to the monitoring surface.

OBJECT OF THE INVENTION

In view of this state of the art the invention has as its object to improve upon a method and a system of the type described at the outset wherein the stand of planting is sensed in a spatial gap-free manner and the effect of the ground condition and plant condition can be taken into consideration simultaneously with morphological and plant physiological characteristics in a location-specific and technologically efficient manner.

BRIEF DESCRIPTION OF THE DRAWING

The invention will be described in greater detail in the following in connection with a number of embodiments. The drawing shows:

FIG. 1*a* a schematic illustration of the arrangement of the sensor on the carrier, FIG. 2 a schematic illustration of the scanning of a stand of plants with laser beams, FIGS. 3, 3*a* and 3*b* the process structure and the sequence of the method according to the invention, and FIG. 4*a* diagram of the fundamentals of the ring storage used.

SPECIFIC DESCRIPTION

Example 1

The method according to the invention is initially described with respect to a region with uniformly disposed plants of a limited area cultivation like wine grapes.

Figure 1:
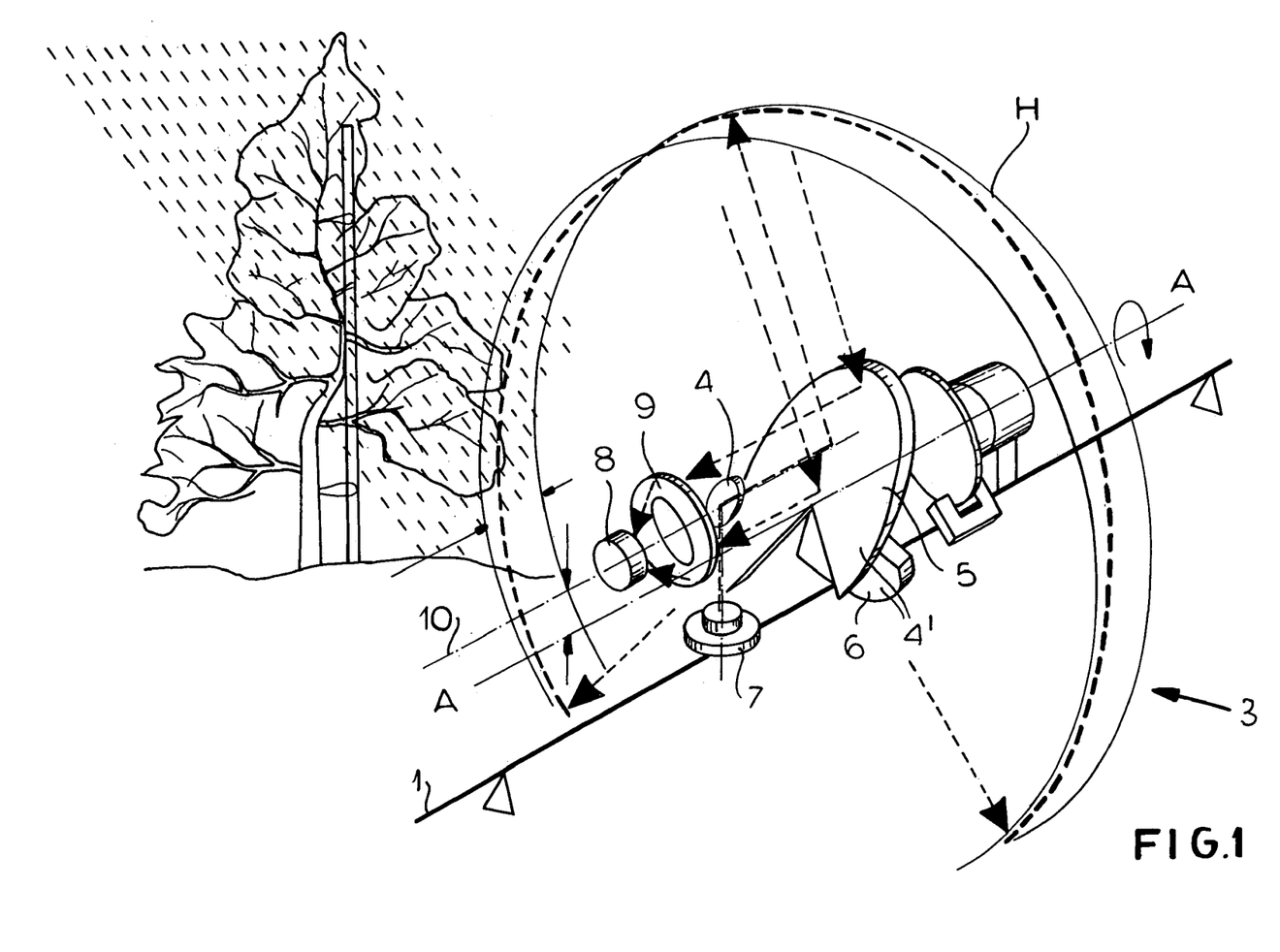
FIG. 1 a schematic illustration of the sensor according to the invention.
Figure 1A:
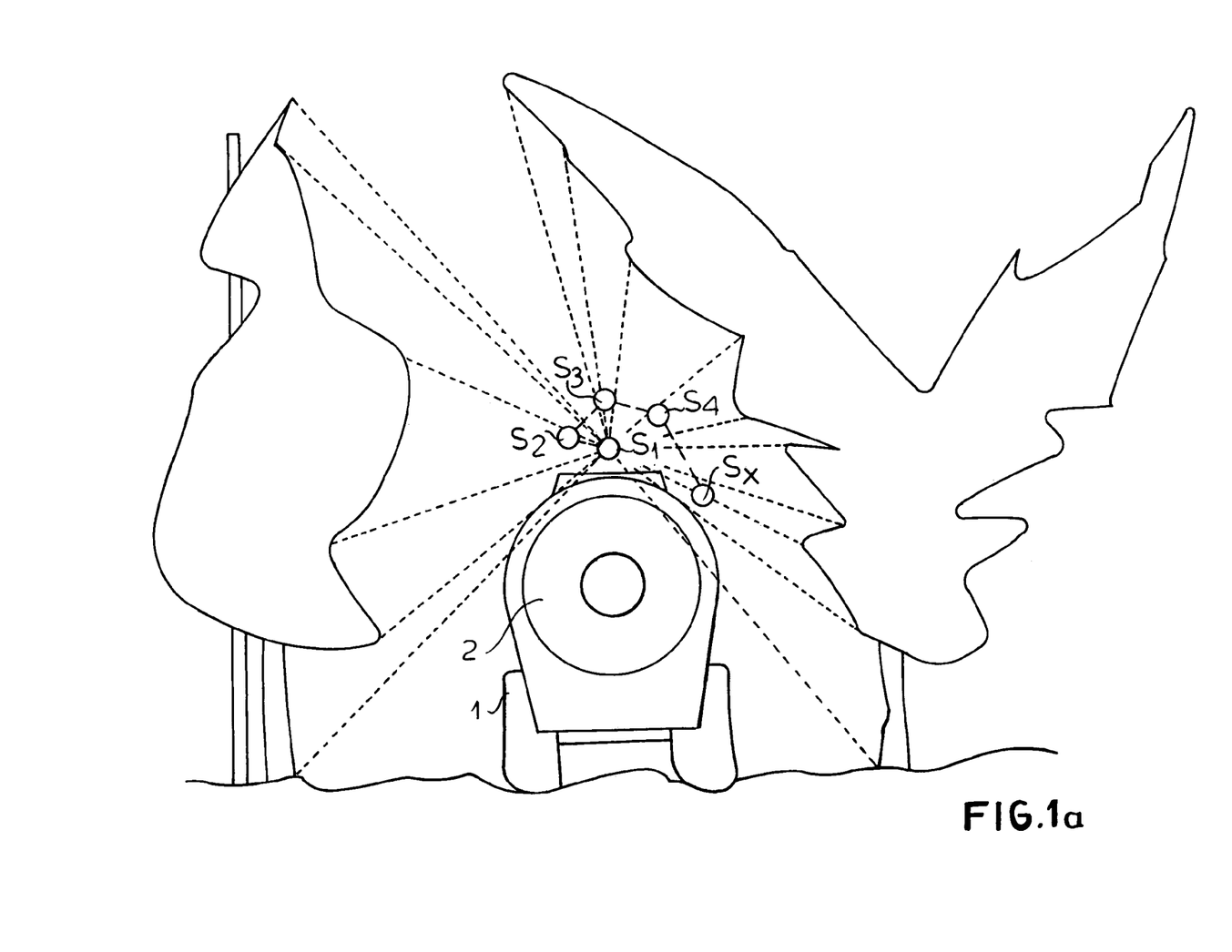

The system according to the invention for the volume specific application of spray agents, for treatment and for processing of plants in a limited area cultivation whose individual plants are disposed close together in rows defining travel paths between them is comprised basically of a traveling carrier 1, for example a tractor, which supports a spray unit 2, a blower for generating a two-phase flow, a central laser sensor 3 which rotates during travel of the carrier along the traveling path and a computer for processing all of the data obtained by the sensor. A container for receiving a spray agent belongs to the sprayer 2 together with a feed pump for displacing the spray agent to the spray nozzle, and valves for opening and closing the nozzles. When the agricultural or soil-working] implements are used, these are fastened correspondingly to the traveling carrier 1.

The sensor 3 comprises, as has been schematically illustrated in FIGS. 1 and 1*a*, a mirror 4' which is arranged to rotate about an axis A. The mirror is inclined differently or at different angles] to the rotational axis A and is configured as a shaped mirror. In this embodiment the mirror 4' is so constructed from pie-shaped circular segments 5 and 6 that the segment 5 has an inclination of 45° with respect to the rotational axis A and the segment 6, an inclination of 67.5° with respect to the rotational axis A, i.e. 22.5° to a normal to the rotational axis A.

The sensor 3 is comprised of a radiation source 7 and a receiver 8. The rotary displacement of the mirror 4' is followed by a rotational angle measurement. Light pulses produced by the radiation source 7 are distributed via the deflection mirror 4 and the shaped mirror 4' in space within the travel path. The objects which are encountered by the radiation beam (foliage walls, leaves, stems shoots and the like) reflect the radiation back via the deflecting mirror 4 and the shaped mirror 4' and this radiation is focused by an optical system 9 onto the receiver 8.

So that the sensor 3 has a free field of view or aperture] for the transmission and received beams, it must be so fixed on the carrier 1 that a sufficient field of view is ensured. The sensor 3 acquires the plants of the strand laterally and above the sprayer 2 in a grid of laser scan points which, as the carrier 1 advances along its travel path, passes in a strip shape in a helical pattern along the plant row. With an angular resolution of, for example 1°, vertical spacing of the scanning point of several cm on the foliage of plant rows with a row spacing of 5 m is possible without further effort. In this example measured values of a grid pattern of about 5×5 cm can be resolved with a high degree of resolution with travel speeds usually of 1 to 8 km/h.

Figure 2:
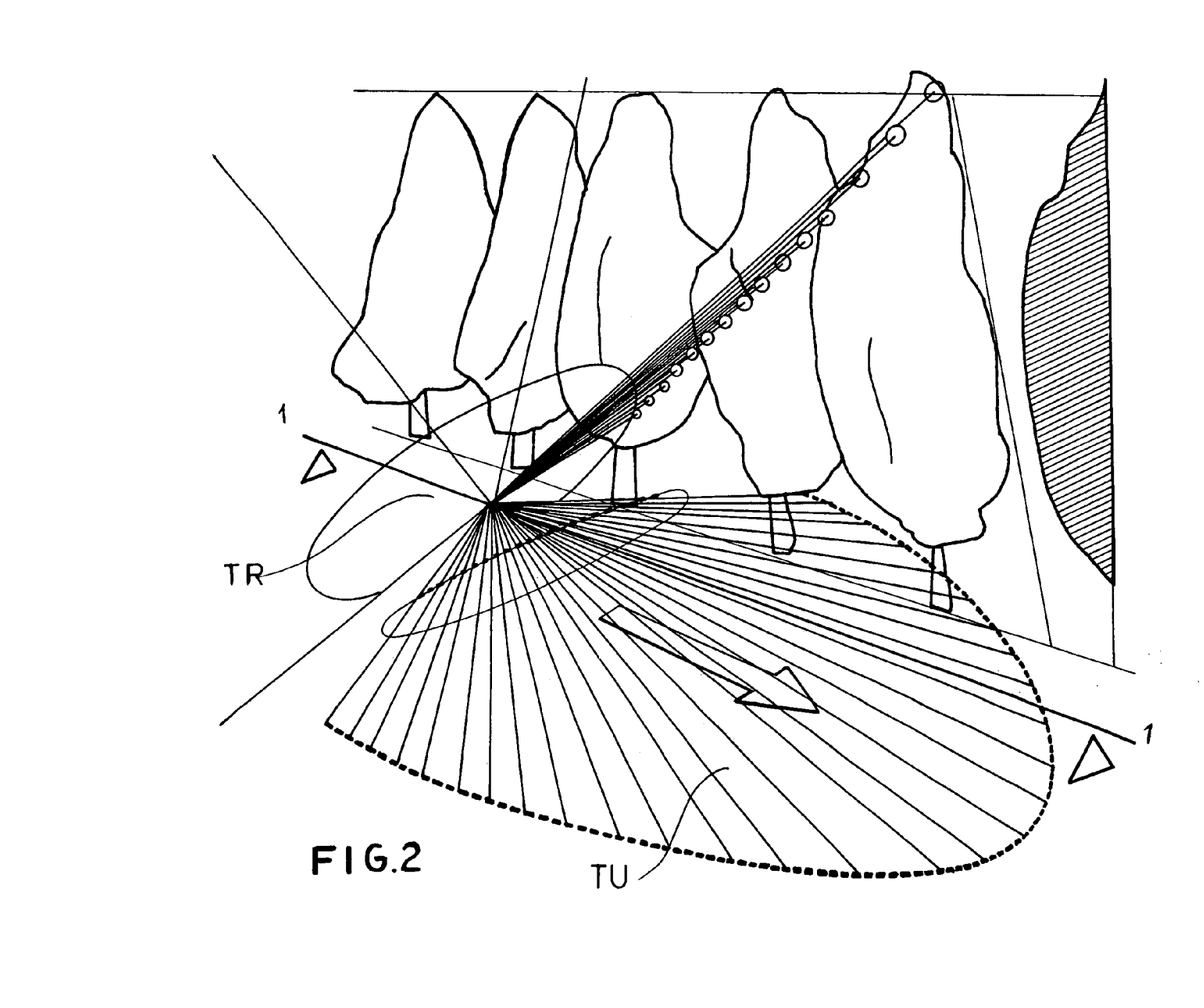

The laser beam is so deflected in the travel direction vertically and forwardly to the side that it sweeps over a conical surface segment open in the travel direction. This part of the laser beam encounters the lower regions of the plants along a line which encompasses objects lying next to one another horizontally. The part of the conical surface segment which in the travel direction lies furthest vertically intersects the ground and forms the apex of hyperbola. Naturally the invention also includes an arrangement in which the laser beam can be deflected opposite to the travel direction.

The rotational axis A of the shaped mirror 4' lies eccentrically in the beam path 10 of the sensor 3. Because of this eccentricity, the radiation-sweep plane of the emitted radiation oscillates by an amount corresponding to the eccentricity perpendicular to the main plane H. A corresponding offset is thus superimposed on the conical surface. The amplitude of the offset follows a full sine curve during one revolution of the shaped mirror 4'

Coarse values can be obtained with the aid of the distance measurement to further removed objects. Objects which lie laterally in the field of view of the sensor 3 give rise to offsets relative to the position of the sensor from one angle segment to another whereby the path can be determine when the distance to the observed object is known. In the case of structures with multiple shapes like the foliage walls of plant stands in a limited field culture, the distance measurement must allow for a selection of significant objects by a filtering of the information with respect to the distance to objects which are recognizable laterally of the carrier 1.

The beam from the pulsed infrared laser source is, as illustrated in FIG. 2, deflected by the rotating shaped mirror 4' for the upper scanning space by about preferably 90° from the beam direction and is distributed in a radiation plane in a circular pattern. The infrared laser source 7 is thus so pulsed that, by means of the shaped mirror with a quasiuniform angular positioning (ratio of the light speed to the angular velocity of the mirror), the reflection signal from the beam-acquired objects is returned back to the receiver 8 of the sensor 3. The scanned region of the sensor does not lie in a single plane and encompasses a solid angle of more than one-quarter of a spherical segment.

Starting from one position on the carrier 1, the scan runs to the side and upwardly in a plane and for this region there is an angle of 45° between the shaped mirror 4' and the rotational axis A. In the travel direction the laser beam is deflected over a reflection angle of >45°. Thus the beam sweeps a conical surface which is directed forwardly in the direction of the travel path from the apex of the cone, whereby the conical axis intersects the travel path in the center of the track of the carrier 1 ahead of the latter. With the conical surface, the plant rows on the sides (independently from mirror angle and position) are scanned from a region of the beam in an approximately horizontal path or slightly inclined path. In this region, the movement of individual objects (trunks, grape stalks, tree poles or the like) or structures (crown volume, front contours of the crown or the like) are so followed, that the structures are determined therefrom and the pattern of the structures relative to the carrier are recognized. From this the distance in the row is determined. Since the plants are cultivated for years in the same places, these positions can be ascertained from the known locations of the plants and the distance therefrom to the carrier and an identification of the plants can be effected. Errors in both measurements can be corrected by appropriate logic.

The scanning plane of the radiation path with a 45° inclined mirror 4', acquires the plants, especially wine grapes, in a pergola configuration or a Mediterranean arrangement with a hollow crown in a vertical direction laterally and above the carrier in a closed arc. Because of the eccentricity, the beam in the course of mirror rotation has superimposed thereon the afore described sinusoidal offset perpendicular to the travel curve. The amplitude is determined by the eccentricity of the mirror angle. Because of the rotational movement of the mirror 4', the offset has always the same magnitude at each location of the travel curve and since this is taken into consideration, the offset does not bring with it any functional disadvantage.

For the localization and measurement of plants and determination of the position of a carrier 1 with a spray device 2 for applying a spray agent in row cultivation, the mirror 4' of the sensor 3 is so configured that a planar and a spatially curved region can be used. The shape and extent of the planar mirror region determines the optical characteristics of the sensor 3 in terms of range and sensitivity. A spatially high resolution light-point grid (raster) of a laser beam from a central radiation source 7 avoids measurement errors which can arise when individual sensors are arranged along a line at different positions and as a result of the travel motion of the carrier.

The central sensor 3 can be positioned in this example in the region of the center of gravity of the carrier so that translation movements and radiation movements of the sensor itself as a consequence of intrinsic movements of the carrier 1 can be taken into consideration and corrected.

The space curve with which the region-around the carrier 1 ahead of, laterally of and above the carrier 1 is observed, has in the region of the transition from one mirror segment to the other, reduced optical power. In this region, the stand of plants is always positioned especially close to the sensor 3 so that a reduced optical power is not a problem.

The arrangement of the sensor 3 is possible both on the carrier 1 and upon the implement.

The sensor 3 can not only be used to control the application of spray agents but is also capable of being used for horticultural purposes in limited area cultivation, nonuniform plantings with trees, shrubs, bushes or the like which today are monitored with different sensors and feelers to detect the grape stalks and trunks and are used for control (mowing, cutting of stalks, binding, deleafing of foliage regions, undercutting of weeds of the rows between trunks or stalks, mulching with grass and with pieces of wood, loosening, sowing, fertilizing and transport). It can especially be used to control the displacement of complete grape harvesters (number, color, ripeness and the like).

The system according to the invention is capable of use for automatic application processes. It eliminates the need for adjustment at the sensor and the carrier. The data acquired with the system according to the invention and such information is useful especially advantageously for stock taking. Especially in the intensive cultivation of fruit, grapes and hops, many different factors can be introduced and combined in order to achieve given production targets, including for example, cutting, binding, deleafing, thinning out of fruit, watering, fertilizing and the like. So that certain factors or combinations of factors can be used, the actual situation in the cultivation on the one hand and on the other, the expected or planned development of plants themselves as well as the environmental conditions including weathering, must be taken into consideration or are of significance. When the farmer who has to make decisions can access precise information as to the status of his plant stand, his decisions are more sound and the risk of erroneous decisions is minimal. Technologically precise and reproducible measurement relative to the sizes of plants, which can be fully documented over long time periods, are extremely convenient and when easily made available can be of great utility.

Men have been cultivating groves of fruit for millennia based upon horticultural factors like cultivation techniques, training and breeding intensively as matched to local conditions including soil, climate and location.

With the aid of the method of the invention and the sensor, georeferenced, locally specific data as to plants can be acquired and used as the basis for a cultivation matched to the locality with optimization of the horticultural processes and handling for the individual plants. For example, with the method according to the invention, the effects of plant protective agents which are used and/or other cultivation features on the plants which are subjected to the treatment, can be determined under the prevailing conditions individually, these conditions including the type of plant, the cultivation, training, fertilization, the climatic conditions, weathering. With this information it is possible to determine dosages for future treatments of the same plant stand with compatible indications so that dosages and application timing of a particular composition or any preparation or other treatment features can be optimized with respect to cost and effectiveness, but also taking into consideration resistance induction and crop yield. This allows also local dosing in individual partial dosages under different treatment conditions or positions and carrying out of horticultural operations as a function of the immediate requirements on individual plants at their individual locations.

With the method according to the invention, it is possible to derive both local distribution of biological and phytophysiological signatures as well as a distribution in time with each travel of the apparatus through the stand of plants. It is thus possible to acquire and follow the effects of various factors and the prevalent boundary conditions of individual plants together with the measurements with time. It is also possible to compare the influence of weathering on the effectiveness over the years and to evaluate it.

Figure 3:
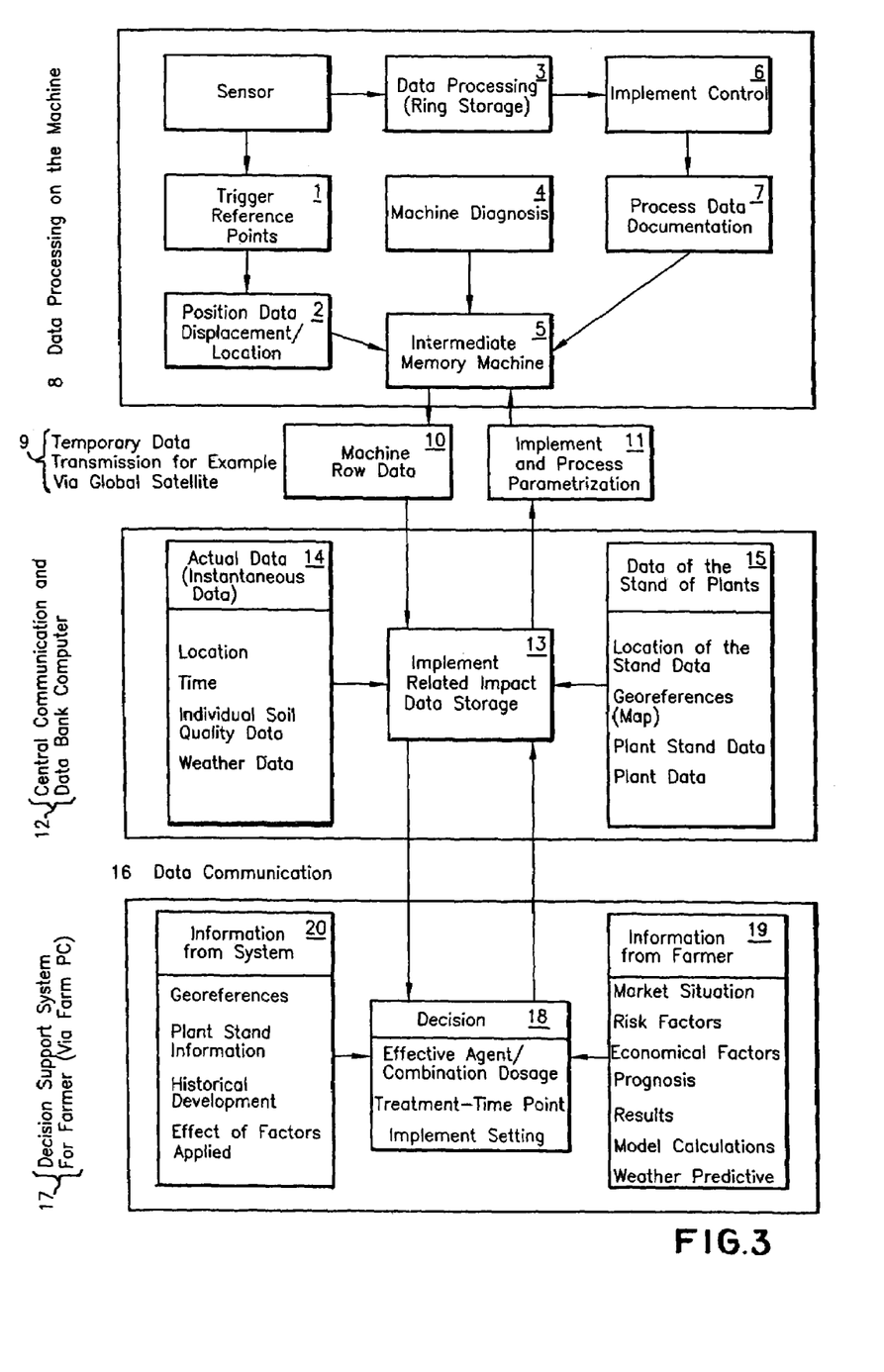
Figure 3A:
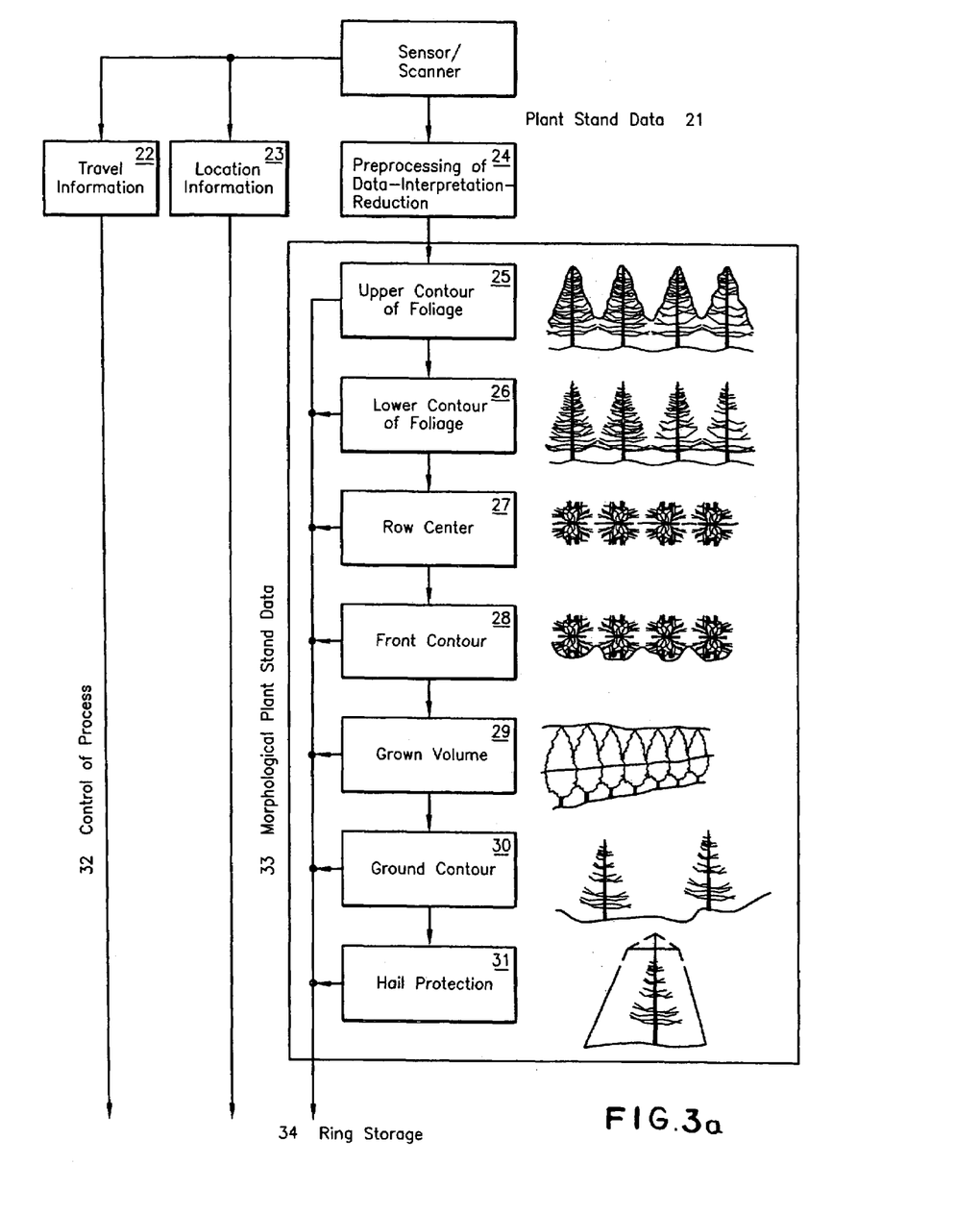
Figure 3B:
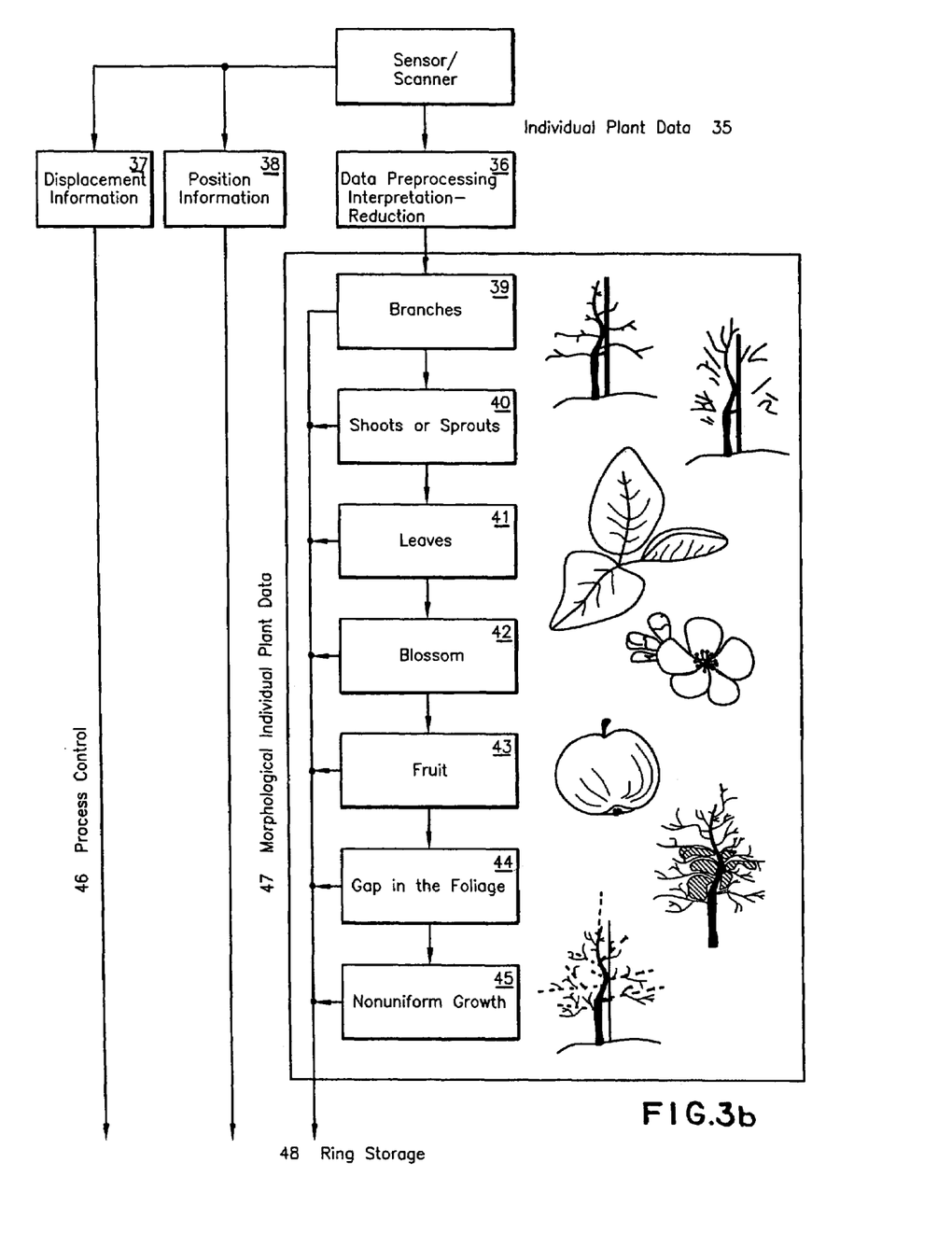

With the method of the invention, whose sequence is schematically illustrated in FIG. 3, 3a and 3b, different stands of plants can be evaluated in a spatial manner and characterized from the point of view of morphology and physiology. The following morphological parameters of a stand of plants can be obtained:

Location of the objects, spacing of the objects and angular position of the objects with respect to the center, Contour of the leaf crown (from the course of the spacing measurements), Volume of the crown from the contour (based upon the assumption that the sighting or target is substantially symmetrical to the row center), The location of the row center form the location of the foliage peaks and the trunks/stalks relative to the travel path, Density from the spacing distribution relative to the dominating front side signal (view through the structure of the foliage wall with impingement on the rear side with exclusion of impingement on objects lying further away by background masking or cancellation), Density, especially foliage density, i.e. area obstruction of the leaves in the leaf wall of structure-forming crowns (without trees), sprout growth or comparison of contour and volume measurements with time, Number of fruit of sufficient fruit size, Yield in number of fruit per area and per plant.

As physiological parameters, the following are acquired:

Color from the level of the reflection signals based upon the assumption that the objects are similarly colored and that comparable distances from the sensor are comparably reflective. The absolute color is thus not of interest but rather the relative course of the signal is of interest as a measure of the saturation of green coloration and thus the number of chlorophyll cells. This distribution gives an indication of the plant feeding or the distribution thereof over the area of the cultivation. From the color distribution, especially in the blossoming of fruit trees, the distribution of the blossom density can be taken as an indicator of the alternance of the trees and the treatment to be matched thereto.

Vitality derived from the color distribution,

Vitality based upon the fluorescence spectrum upon evaluation of the reflection radiation.

At a known spacing from an object, the reflection level of the received signal is a measure of the color, orientation and optical surface characteristics of the reflecting object. By analysis of the signal level, a distribution of the optical signal over the area can be determined and used as a measurement for the vitality.

Natural green from a plant reflects light from the lower infrared portion of the spectrum significantly better than other objects (green peak in the reflection spectrum). This is dependent upon the type, the nutritive situation of the plants or the degree of ripeness of the fruit and so forth. If the degree of reflection of different lower infrared spectra are compared, it is possible to distinguish between chlorophyll-retaining enlivened plant parts and object retaining less chlorophyll like ripened fruit and objects which are not chlorophyll-retaining like fence posts.

The evaluation and utilization of signal level information presupposes that influences of the distance to the target object which can give rise to a spreading of the radiation and the reduction of the signal level is taken into consideration at increasing distances.

Differences in the reflection signal level can then be quantifiable when the spacing information is taken into consideration and it is understood that it represents comparable target objects, for example leaves of a comparable vegetation stand upon travel through that stand. Signal level measured values at comparable measurement distances supply basic information as to color-dependent cultivation characteristics which can be taken into consideration during the working of the cultivation. Without a differentiation between different spectra, one can obtain indirectly through the course of the reflection signal level in space, an indication as to the distribution of vitality based upon the chlorophyll activity.

A laser beam encounters upon irradiation of a natural foliage wall individual or multiple leaves or sprouts in a random manner. This requires a special assignment of the corresponding distance information to the individual objects encountered by the beam. For this purpose, a multiplicity of timing circuits are started simultaneously when the beam is transmitted. Each timing circuit has another level value at which the time is stopped (cascade). With this system, a multiplicity of transit times are measured for different reflection angles. The distance to partly encountered objects is thus determined. With the aid of such an arrangement it is possible to detect whether a particular reflection level arises from a target object alone or from various objects, in which case the value is reduced. The vitality indication can thus be formed exclusively from reliable reflection values of individual objects.

The object color in plant cultivations varies within a stand of plants in the green region of the spectrum (yellow green, deep green, blue green, etc.) or in the case of a blossoming stand of apple trees in a white-pink region.

From this it can be determined if color variations or signal variations occurring in large volumes have their origins in local conditions or conditions associated with plant structural features. Differences which are derived from small volumes are associated with plant physiological origins and can be the basis for differences in the application of plant protective agents or the selection of horticultural operations and procedures.

The natural leaves fluoresce when they are irradiated with laser light. From the signal level and the frequency, conclusions as to vitality can also be drawn.

Figure 4:
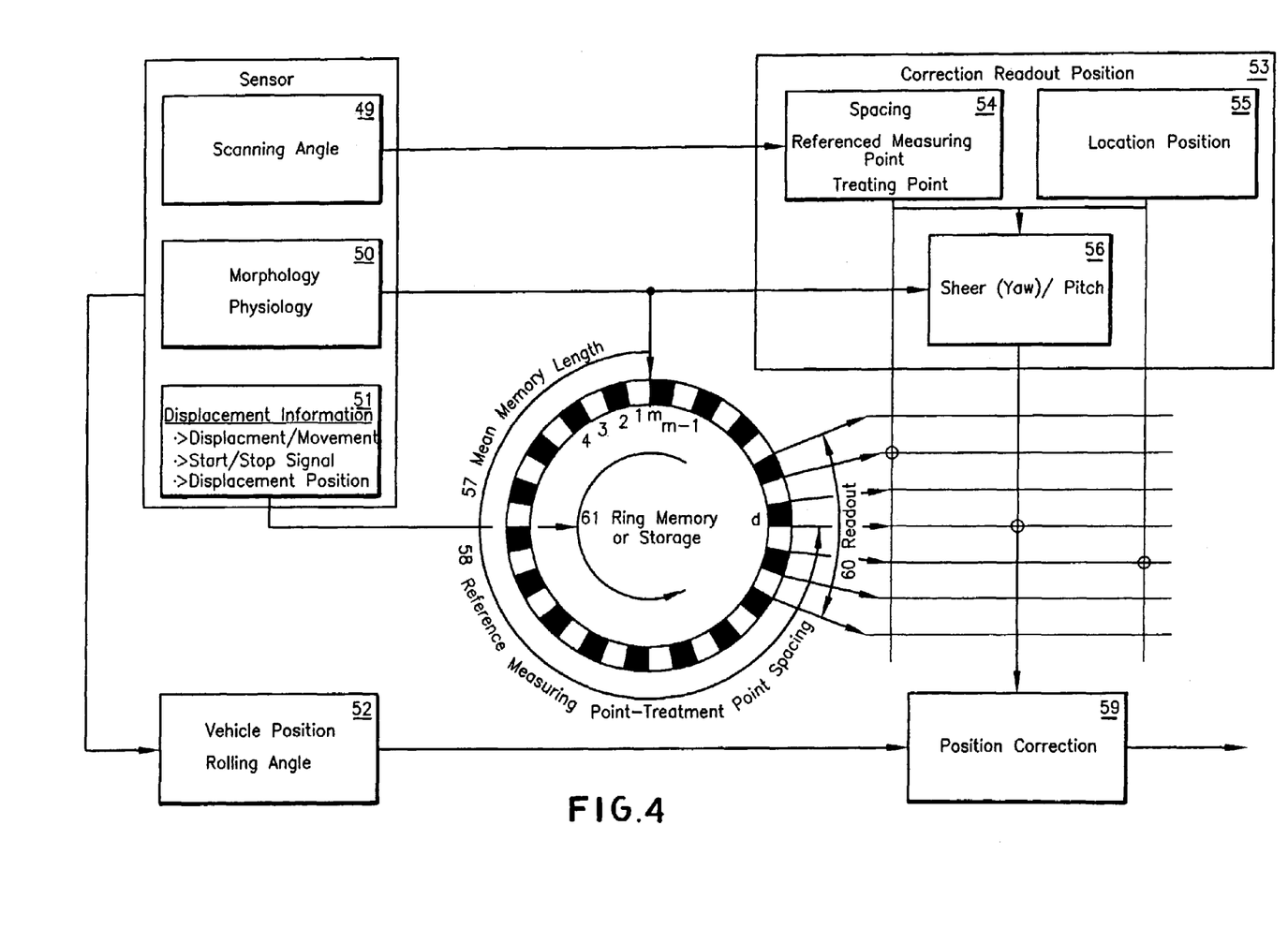

In FIGS. 3, 3a and 3b, the course of the method according to the invention has been schematically diagramed. The stand of plants is scanned with the laser sensor 3 as has been described previously and the travel data, position data and target location data as data as to the stand are interpreted in a data preprocessor and subjected to a data compression. From these data, the upper contour of the plant stand including gaps is determined. There is then a determination of the lower contour. In a further operating step, the median planes, the crown volume, the front contours and nonuniformities (FIG. 3b) are determined. All of these data are conditioned and fed to a ring memory and are stored therein in intermediate storage. The ring memory is defined from position to position, whereby the number of increments of the ring storage is greater than the number of increments which correspond to the spacing between sensor and nozzles. A multiplicity of ring memories are provided for different data components. The different ring memories give the data various ring storage positions free. The data required for the respective treatment position is selected from the ring memories whereby the positions of the ring memories are determined by the travel position, location position, the distance to the target and the height of the position under consideration (beam deformation) (see FIG. 4).

Example 2

The method according to the invention is employed for the treatment or working of such plants which in practice do not grow in a regular manner in rows. Initially a travel path as a reference is made through a first transit of the stand of plants based upon objects such as trees or the like which lie along the travel path and are of a marked or striking nature. The localization of these objects allows repetitive travel along this track, for example, in deep forests, in old olive groves or citrus gardens.

The large trees are measured and estimated with the sensor 3. AS the vehicle travels through, the light point grid sweeps the laterally lying vertical objects in a close three-dimensional sequence. The inclined scanning plane ensures that a trunk is scanned from the top down in planar disk-shaped scans which are inclined from the upper region downwardly and horizontally. The thus detected three-dimensional half shells of the trunk of the branches projecting therefrom make it possible to determine the useable volume and the lengths of such straight segments. The growth of wood and thus the individual crop yield of each tree can be determined by repetitive measurement with a sufficient spacing in time.

If the sensor 3 is used to gauge trees lined up in a row based upon the branches extending inwardly into the so-called travel path, the sections of the branches can be scanned to select for the individual growth of the individual trees, for example based upon different plant structures, reliability considerations or from the point of view of appearance and dead branches removed from consideration or old, sharply hanging branches, or younger lateral sprouts treated in a targeted manner.

Because of the 3D image of the sensor which can be obtained by the method according to the invention, the manual operations of tree maintenance can be automated and optimized in different directions. Comparable applications of the system according to the invention are possible for the harvesting of large plants, for example banana plantations, cacao trees or in natural rubber plantations.

The mentioned applications of the method according to the invention follows a particular travel path along which the plants are detected, localized and measured with the position determination of the plants described in detail previously, the travel track later can be reproduced in nonconsolidated tracts. On the basis of a multiplicity of determinations at different points in time of the three dimensional scenery encompassing the plants, an evaluation and selection of the features of significance can be made like the removal of certain plants (trees), plant parts (branches, fruit and the like).

Example 3

An obvious other application of the method of the invention, namely the picking of grapes, follows the procedure outlined in Example 2. A carrier 1 travels repeatedly along the same tracks and determines morphological and physiological signatures and the surrounding vines. From a comparison of the individual grape branches, the grapes are identified and based upon their reflection levels and their size, determinations are made as to a certain taste, degree of ripeness and material content.

With the localization of such grapes, geometric localization data is available relative to the sensor which can be used for controlling a harvesting gripper including shears for the separation of table grapes from the vine or the harvesting of wine grapes.

The mechanical picking of bunches of grapes with so-called full grape harvesters, requires from the driver of the vehicle high concentration over long periods of time to guide the harvester in a centered manner over the plant rows such that a full harvester will be effective on both sides of the plant row with its shaking units symmetrically so that the picking is effective and the vines are completely harvested.

The system according to the invention enables the full harvester to be so guided between the vines that the shaking elements follow individual plants in their engagement geometries since the grapes ripen on the vine stalks at different heights, in different densities and number, the targeted spatial guidance of the picking elements of a full harvester increases the useful production of undamaged picked products (berries) and reduces the amount of vine twigs and plant parts which are shaken off the vines.

The grape picking thus can utilize physiological data of the grapes and can be carried out in multiple passes, each partially removing the grapes, including for example a prepicking and a final picking, leading overall to an exceptionally complete harvest.

Analogously to the picking, the binding of the vine in the production of wine grapes utilizing a binding implement displace-able along the row is possible. This implement can be mounted at the front of the carrier and arranged in the field of view of the travel so that the travel along the rows is effected utilizing the steering. Irregularities in the traveled track which previously could not have been detected by the driver nor taken into consideration to avoid collections of the plants and of the apparatus, including possible damage to the apparatus in the past could not be avoided. With the solution according to the invention, the binder implement can be guided above and along the row so that all overhanging parts are acquired and collisions with the posts of the plant supports and the wires stretched between the posts can be reliably avoided.

Example 4

The method of the invention can be used in fruit orchard layouts. All previous features of pruning, binding and harvesting are applicable to the individual fruit, the individual branch or limb. Pruning actions on fruit trees are usually carried out in the winter on fruit trees after loss of their leaves. The resulting transparency of the structure forming fruit trees allows the measurement and evaluation of the branches and limbs. The evaluation of the plant structure of each branch or limb requires a recognition of the edge thereof, its configuration and orientation to the trunk and its relationship to the sap flow. The history of the branching of an individual plant for pruning purposes can be obtained and the contribution to the visible blossom shoots precisely determined and evaluated. The localization of a pruning implement projecting from the carrier is possible with the aid of the afore described 3D data in the same manner as the individual grape bunches are picked or for targeted deleafing for apple/citrus fruit harvesting. In the working of fruit or vineyard cultivations with the method of the invention, the soil-working and undergrowth maintenance is included in the travel of the apparatus through the plant stand. With the ring storage described in greater detail in FIG. 4, control of soil-working tools and undergrowth maintenance tools is possible in the same way as has been described for the application of fertilizers for materials effected on the plants.

The invention claimed is:

1. A method of treating the ground and plants as required and in a volume-specific manner, in uniformly or nonuniformly planted areas in which the plants are scanned with a monochromatic pulsed laser beam displaced past the plants and circulating adjacent the plants while affixed to a traveling carrier, the radiation spectrum reflected from the leaf structures being picked up by a sensor and the acquired spectrum being converted into optical signals and these signals being fed to a computer which stores the signal, evaluates them for controlling the application/dosing of the spray agent doses as a function of the vegetation state or the working of the soil and the treatment of the plants as well as the harvest by outputting of switching commands to control the spray device arranged upon the traveling carrier and blowers or working implements, characterized by the following steps a) generating a reference track in the area with a first transit with determination of the positions and localization of characteristic referenced objects adjacent the track;
   b) scanning the plants in reference to the reference track trace by transmitting an oscillating pulsed laser beam in a somewhat horizontal or slightly inclined path forwardly, laterally and above the carrier in a conical surface segment open in the travel direction and forming a space curve which encounters the plant rows by forward travel of the carrier in a somewhat spiral shape, the laser beam producing in space a highly resolved light point grid or raster upon the plants in different scanning planes;
   c) starting one or more time-measurement circuits simultaneously in time with the emission of the laser beam according to step b), the time measurement circuits being associated with different level values;
   d) stopping the time-measurement circuits upon determination of the different reflection levels of the reflected radiation components from the light point grid or raster for separate or common determination of travel data, position data and target location data, picking up the radiation component through the sensor transmitting the radiation and feeding the signals over a receiver unit which determines the transit times of the signals from the signals in the converted data of the computer and depositing the data in a ring memory of the computer;
   e) determining the morphological and physiological characteristics of the plant stand or of the individual plants from the data according to step d); and
   f) correcting the position of the spray device and the blower or of the working implements by compensating for deviations in the travel data, position data and target-location data as a result of rolling movements, undulating movements and pitching movements of the carrier, and
   g) enabling the metering, the nature and extent of the working corresponding to step e) and f) and control of the spray device for applying the spray agent or the working implements.

2. A method according to claim 1 wherein as the laser radiation, a radiation with a wavelength of 700 to 1000 nm is used.

3. A method according to claim 1 wherein from the data of step d) information as to target areas of the plants, as to the planting, structure and topography of the stand and the undergrowth, are determined.

4. A method according to claim 1 wherein parts of the plants are distinguished with the sensor.

5. The method according to claim 1 characterized in that the objects distinguished by the sensor are support frames, posts or wires or cables spanning posts.

6. The method according to claim 1 characterized in that the environmental structures distinguished by the sensor are the ground, ground profile, landscape markers, buildings, structures, walls, roads and fencing or enclosures.

7. The method according to claim 1 characterized in that a contactless measurement of travel is carried out with the sensor.

8. The method according to claim 7 characterized in that in the travel of the carrier through a stand of plants the travel displacement measurement is set at zero at significant locations.

9. The method according to claim 7 characterized in that the actual position of the carrier after a first transit through the stand of plants is compared with the known position and layout of the stand and corrected.

10. The method according to claim 7 characterized in that with the measurement of travel, differences in the measured values of the left and right rows of the stand along the traveled trace are determined and movements about an upright axis and in curved travel are established.

11. The method according to claim 7 characterized in that the displacement information for determining the travel is obtained from a recognition of tree trunks, vine stalks or plant stakes.

12. The method according to claim 7 characterized in that the displacement information for determining the travel is obtained by following the sprouting tips of the individual plants.

13. The method according to claim 7 characterized in that the displacement information for determining the travel is obtained by following the front horizontal cross sectional contours of the planting.

14. The method according to claim 7 characterized in that the displacement measurement is obtained by following vertical objects during travel through the scanning field of the sensor, whereby the objects during travel through the scanning field of the sensor, whereby the objects are acquired at different heights one after another in a timed relationship and the detected time intervals provides a measurement of the speed.

15. The methods according to claim 7 characterized in that the displacement measurement is carried out independently of the travel speed.

16. The method according to claim 7 characterized in that all evaluation methods for determination of the travel information are collected and correlated with old data as to the stand of plants.

17. The method according to claim 1 characterized in that the position of the sensor along the travel path in a predetermined position is measured and stored.

18. The method according to claim 17 characterized in that the position of the sensor and the displaceable carrier is measured progressively along the travel path at all positions.

19. The method according to claim 17 characterized in that the actual measurement location of the carrier and the location of the stored predetermined position of the sensor are compared as soon as the carrier has traveled a distance which corresponds to the distance between the sensor and the nozzles or the working implements.

20. The method according to claim 1 characterized in that the location of the axis of the carrier relative to the frame is corrected to compensate for rolling movement.

21. The method according to claim 1 characterized in that the location of the carrier about the vertical axis is adjusted to compensate for pitch movements.

22. The method according to claim 1 characterized in that the location of the transverse axis of the carrier is adjusted to compensate for travel relevant errors by shifting forwardly or rearwardly the spray zone (pitching) relative to a center of gravity.

23. The method according to claim 1 characterized in that the location of the target point is determined by measurement of the distances between target surfaces and the sensor.

24. The method according to claim 1 characterized in that the working of the soil includes a loosening, crumbling, furrow formation, or an effect on the fertilization or temperature.

25. The method according to claim 1 characterized in that the underground maintenance is carried out by mowing, mulching, chopping erosion protection, shielding from the sun, covering or the influencing of the microclimate thereof.

26. The method according to claim 1 characterized in that the horticultural operations on the plants include a cutting, binding, a shaping, a trunk trimming, clearing, collaring, root cutting or harvesting.

27. The method according to claim 26 characterized in that the cutting is a coarse cutting, fine cutting, shaping, limb removal, topping, cordon cutting, hop cutting or fruit tree pruning.

28. The method according to claim 1 claims wherein in the harvest of fruit, a distinction is made between grape harvest and fruit harvesting.

29. The method according to claim 1 characterized in that a distinction is made between fruit to be harvested, shoots or plant elements which are to be removed.

30. The method according to claim 1 characterized in that in the sorting a distinction is made between fruit or in the classification of the fruit.

31. A system for carrying out the method according to claim 1 with a traveling carrier, a sensor affixed to the carrier with a radiation source for transmitting a pulsed laser beam, a mirror rotatable about a vertical axis for training the beam onto a foliage wall, a radiation receiver for collecting the radiation reflected from the foliage wall, a computer for processing the reflected radiation and for controlling nozzles affixed to the carrier of a spray device with a supply vessel for the spray agent whereby the nozzles are arranged at a certain distance from the sensor, a liquid pump for displacing the spray agent to the nozzles, valves for opening and closing the nozzles and a blower for producing a two phase flow characterized in that mirror (4') is configured as a shaped mirror having a partial region (5, 6), inclined at different triangles with respect to the rotational axis of the mirror (4') is arranged eccentrically to the radiation path (10) of the emitted radiation and received radiation.

32. A system according to claim 31 characterized in that the mirror (4') is configured with pie shaped circular segments of which one segment is at an inclination angle of 45° with respect to a normal to the rotation axis A of the mirror.

33. A system according to claim 31 characterized in that the radiation path is coaxial with the rotation axis of the mirror.

34. A system according to claim 31 characterized in that the radiation source is provided with at least one time measurement circuit triggerable by a light pulse.

35. The apparatus according to claim 31 wherein the receiver is provided with at least one device for acquiring the transit time.

36. A system according to the claim 31 characterized in that the optics for the radiation configuration is arranged spatially fixed between the radiation source/receiver and the mirror.

37. A system according to claim 31 characterized in that the sensor follows the movement of the carrier during travel without a lag.

38. A system according to claim 31 characterized in that the axis of the sensor is arranged in a forwardly inclined direction.

39. A system for carrying out the method according to claim 1 with a traveling carrier, a sensor affixed to the carrier with a radiation source for emitting a pulsed laser beam, a mirror rotatable about a vertical axis for training the radiation on a foliage wall, a radiation receiver for collecting the radiation reflected from the foliage wall, a computer for processing the reflected radiation and for controlling at least one agricultural implement affixed to the carrier, whereby the implement devices are spaced at a given distance from the sensor wherein the mirror (4') is configured as a shaped mirror, whose partial regions (5, 6) are inclined with different angles to the rotational axis (A) and the rotational axis of the mirror (4') is eccentric to the radiation path (10) of the emitted radiation and collected radiation.

40. A system according to claim 39 characterized in that as the agricultural implement, a cutting device, a digging device, an excavating device, an undercutting device, a binder device, a shaping device, a clearing device, a shaking device, a sorting device or a complete harvesting device, is provided.

* * * * *